US012172869B2

(12) United States Patent
Haikonen et al.

(10) Patent No.: US 12,172,869 B2
(45) Date of Patent: Dec. 24, 2024

(54) ELEVATOR AND A METHOD OF MAINTAINING AN ELEVATOR

(71) Applicant: Kone Corporation, Helsinki (FI)

(72) Inventors: Aki Haikonen, Helsinki (FI); Anssi Venho, Helsinki (FI); Mika Ijas, Helsinki (FI); Kai Prusti, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/365,386

(22) Filed: Aug. 4, 2023

(65) Prior Publication Data

US 2023/0373755 A1 Nov. 23, 2023

Related U.S. Application Data

(63) Continuation of application No. PCT/EP2021/052749, filed on Feb. 5, 2021.

(51) Int. Cl.

| | |
|---|---|
| ***B66B 5/00*** | (2006.01) |
| ***B66B 1/34*** | (2006.01) |
| ***B66B 11/00*** | (2006.01) |
| ***B66B 13/30*** | (2006.01) |

(52) U.S. Cl.

CPC .......... *B66B 5/0025* (2013.01); *B66B 1/3461* (2013.01); *B66B 11/0005* (2013.01); *B66B 13/30* (2013.01)

(58) Field of Classification Search

CPC .... B66B 11/0005; B66B 1/3461; B66B 13/30

See application file for complete search history.

(56) References Cited

U.S. PATENT DOCUMENTS

| | | | |
|---|---|---|---|
| 2020/0180910 A1 | 6/2020 | Kattainen et al. | |
| 2022/0055862 A1* | 2/2022 | Wang | B66B 19/00 |
| 2022/0274804 A1* | 9/2022 | Li | E04B 1/5831 |

FOREIGN PATENT DOCUMENTS

| | | | |
|---|---|---|---|
| CN | 109665414 A * | 4/2019 | B66B 1/365 |
| JP | 6203068 B2 | 9/2017 | |
| WO | WO-2020/245373 A1 | 12/2020 | |

OTHER PUBLICATIONS

Machine Translation of JP 6203068.*

International Search Report and Written Opinion of the International Searching Authority for International Application No. PCT/EP2021/052749 dated Oct. 11, 2021.

* cited by examiner

*Primary Examiner* — Diem M Tran

(74) *Attorney, Agent, or Firm* — Harness, Dickey & Pierce, P.L.C.

(57) ABSTRACT

The invention relates to an elevator, comprising a hoistway with a plurality of hoistway sections attached to each other to provide a hoistway with a hoistway space, an elevator car arranged in the hoistway space to be vertically movable in the hoistway space between door openings at landings of a building, and doors at the door openings. In order to avoid problems caused by a mutual change of height of a hoistway and a building, a sensor provides to a control system a signal indicating a level difference between a first reference point of the hoistway and a second reference point of the building.

13 Claims, 2 Drawing Sheets

ELEVATOR AND A METHOD OF MAINTAINING AN ELEVATOR

CROSS-REFERENCE TO RELATED APPLICATION

This application is a continuation of PCT International Application No. PCT/EP2021/052749 which has an International filing date of Feb. 5, 2021, the entire contents of which are incorporated herein by reference.

BACKGROUND OF THE INVENTION

Field of the Invention

This invention relates to an elevator and to a method of maintaining an elevator.

Description of Prior Art

The building industry has in resent years taken into use new building techniques with the aim of speeding up and making the building process more efficient. These changes have also an impact on elevators, as it is necessary to come up with solutions suitable for use with modern building techniques.

One known solution is to construct an elevator in such a way, that the elevator hoistway includes a plurality of hoistway sections attached to each other to provide a hoistway with a hoistway space. An elevator car is arranged in the hoistway space to move vertically in the hoistway space between door openings at landings of the building.

This way of constructing an elevator hoistway of hoistway sections instead of constructing the hoistway as a part of the building raises new challenges. One challenge is that the height of any construction tends to change over time. Due to this, as the hoistway is not constructed as a part of the building, the change in height of the hoistway and the building may be different overt time. Particularly, in very high buildings this may cause problems, which in worst cases may not be detected until problems occur during use of the elevator.

SUMMARY OF THE INVENTION

An object of the present invention is to solve the above-mentioned problem. This object is achieved with the elevator according to independent claim 1 and the method according to independent claim 10.

Use of a sensor providing to a control system a signal indicating a level difference between a first reference point of the hoistway and a second reference point of the building, makes it possible to obtain an efficient and simple solution to prevent problems caused by mutual changes of the height of a hoistway and a building.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
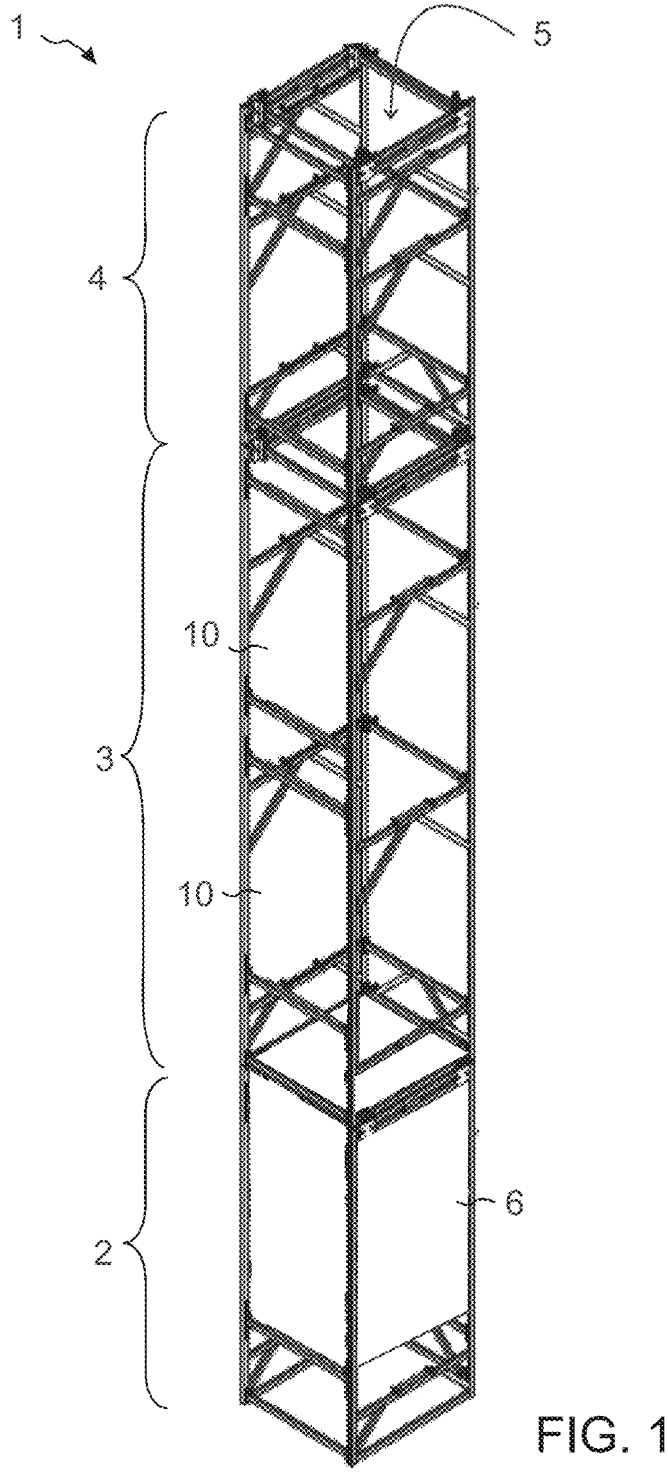
FIG. 1 illustrates an elevator hoistway.

FIG. 1 illustrates an elevator hoistway 1 with a plurality of hoistway sections 2, 3, 4 attached to each other to provide a hoistway with a hoistway space 5. An elevator car 6 is arranged in the hoistway space 5 to be vertically movable in the hoistway space 5.

In the illustrated example the hoistway sections 2, 3, 4 are by way of example implemented as modules arranged on top of each other, each hoistway section 2, 3, 4 or module providing a part of the hoistway space 5 where the elevator car 6 moves during operation between door openings 10 at landings of a building. Additionally, the hoistway sections which are at a lower level carry the weight of the hoistway sections arranged on a higher level. The number, height and size of the hoistway sections may vary depending on the implementation. In the illustrated example, three hoistway sections 2, 3 and 4 are provided. The lowest hoistway section 2 and the uppermost hoistway section 4 have a height which is smaller than the height of the intermediate hoistway section 3. The hoistway sections may be manufactured of steel, for instance.

The hoistway 1 of FIG. 1 is consequently implemented as a free standing and self-supported entity, which can be pre-manufactured at a factory and assembled at a building site, which makes assembly work very rapid. The hoistway may be vertically supported by the ground or by a base of a building for instance, which carries the weight of the hoistway and other parts of the elevator.

Figure 2:
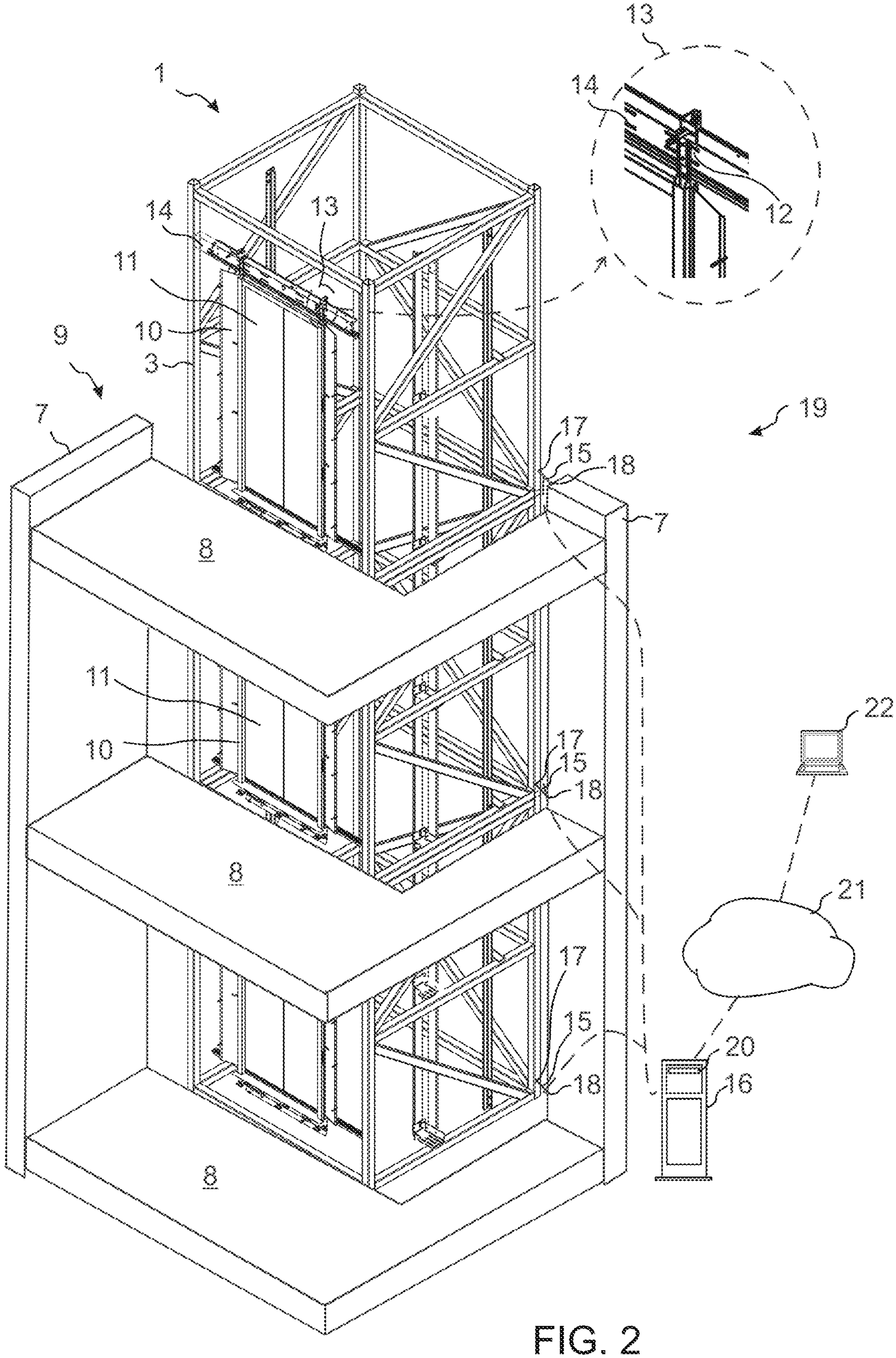
FIG. 2 illustrates an elevator with a hoistway according to FIG. 1 in a building.

FIG. 2 illustrates an elevator with a hoistway 1 according to FIG. 1 in connection with a building 9. Only a part of the hoistway and of the building 9 are shown in FIG. 2. In the following it is by way of example assumed that the building 9 is made of concrete, for instance. Consequently, the building 9 comprises vertical concrete pillars 7 carrying floors of concrete where elevator landings 8 have been implemented. As previously explained the building, such as the pillars 7, do not need to carry the weight of the elevator or of the hoistway 1. Instead the hoistway may be supported from below by the ground or by foundations of the building, for instance.

For simplicity, intermediate walls arranged between the landings 8 and the elevator hoistway 1 are not illustrated in FIG. 2, but only the door openings 10 (located in the intermediate wall) and the doors 11 are illustrated. In this example, it is assumed that each opening 10 is provided with one door 11 consisting of two slidably arranged sections, though also other types of doors may be used.

The doors 11 are suspended by the hoistway 1 via height adjusters 12. An enlargement of the door attachment is illustrated in the circle 13. In praxis, the height adjusters 12 are slidably suspended by rollers on a vertical beam 14 of the hoistway 1 to facilitate height adjustment to the doors 11 in relation to the hoistway 1. The height adjusters may include bolts and nuts, for instance, which make it possible to vertically adjust the height of the door from landings of the building, for instance.

In case a mutual change in height occurs between the building 9 and the hoistway 1, devices in the elevator may require height adjustment to compensate for the mutual change of height. Most likely, the need for adjustment is biggest in the upper part of the elevator hoistway. As the doors 11 are suspended by the hoistway 1, these doors are included in the devices that may require height adjustment. In case the doors 11 are incorrectly positioned in the vertical direction, service personnel are able to carry out height adjustment of a door via the height adjusters 12.

If the building 9 is made of concrete 9 and the hoistway 1 of steel, typically the concrete shrinks our time such that the height of the building decreases while the hoistway made of steel does not shrink over time. Consequently, due to shrinkage of concrete, a situation may occur where the doors 11 suspended by the hoistway are located at a level which is too heigh in comparison to the level of the landings 8.

FIG. 2 also illustrate a sensor 15 providing to a control system 16 a signal indicating a level difference between a first reference point 17 of the hoistway 1 and a second reference point 18 of the building 9. In some implementations one sensor only may be sufficient, in which case the sensor with the first and second reference points may be provided in an upper part 19 of the hoistway and the building. With such an implementation, A total change in the mutual height between the hoistway and the building may be detected based on signals from this sensor.

The type of the used sensor 15 may vary depending on the implementation. One alternative is to utilize a force sensor having a first end attached to the first reference point 17 of the hoistway 1 and a second end attached to the second reference point 18 of the building 9. In that case the signal provided to the control system indicates the tension in the sensor, which is dependent of the mutual change of height between the hoistway and the building. In case the height of the building decreases while the height of the hoistway remains unchanged, the tension increases such that the control system may detect a change in the level difference. However, naturally it is also possible to utilize other types of sensors.

In the illustrated example, the elevator is provided with several sensors 15, each sensor 15 providing to the control system 16 a signal indicating a level difference between a first reference point 17 of the hoistway and a second reference point 18 of the building, wherein the sensors and the corresponding first and second reference points are located at mutually different heights of the hoistway 1 and the building 9. For each sensor, the first and second reference points 17, 18 may initially, when a new building is taken into use, be located at exactly the same height or at difference heights.

The control system 16 may be implemented as a part of an elevator control installed at the installation site of the elevator, for instance. In practice the control system 16 may be implemented by circuitry or a combination of circuitry and a processor running a program. One alternative is to utilize a computer in the control system 16 which runs a program. The control system 16 processes the signals obtained from the one or more sensors 15 and provides information indicating a level difference between the first and second reference points. This information may be indicated on a display 20 located at the installation site of the elevator. Alternatively, this information may be indicated by transmission via a communication system 21 to a service center 22 which monitors the operation of the elevator. The service center 22 may in that case be remotely located from the elevator and it may monitor the operation of a plurality of elevators which are located in the same or different buildings, for instance. In any case, service personnel can based on the indicated information determine the possible need for height adjustment of the doors.

The exact way in which the control system 16 processes the signals received from the one or more sensors may vary. One alternative is that the control system has stored in memory previous indications from each sensor. In that case the latest indication may be compared to one or more previous indications from the same sensors, such that the change in the level difference can be determined and indicated. Alternatively, in case of a force sensor for instance, the force sensor may originally have been installed (when the new building was taken into use) such that the force is in practice zero. In that case, when the level difference between the first reference point 17 of the hoistway and the second reference point 18 of the building changes, this results in a force in the force sensor, due to which the control system 16 is provided with a signal indicating the size of the force, which correlates to the change in height between the hoistway 1 and the building 9. The indication from the control system may consequently indicate the level difference as the magnitude of a force detected by a force sensor, or alternatively, as a distance corresponding to a detected force, for instance.

A solution as explained above in connection with FIGS. 1 and 2 makes it possible for service personnel to maintain an elevator of a building 9. Initially, the mutual change of height between the elevator hoistway 1 and the building 9 can be determined by a sensor 15 providing an indication of a level difference between a first reference point 17 of the hoistway and a second reference point 18 of the building. In case the determined mutual change of height has reached a predetermined limit, service personnel can adjust heights of devices in the elevator to compensate for the mutual height change. Such devices include the height adjusters 12 via which doors 11 at landings 8 of the building are suspended by the hoistway 1. In praxis, such a mutual change of height is a very slow process, which means that sufficient time remains for adjustment if the situation is checked in connection with normal maintenance work of the elevator which is carried out at predetermined service intervals, for instance.

It is to be understood that the above description and the accompanying figures are only intended to illustrate the present invention. It will be obvious to a person skilled in the art that the invention can be varied and modified without departing from the scope of the invention.

The invention claimed is:

1. An elevator, comprising:

a hoistway with a plurality of hoistway sections attached to each other to provide a hoistway with a hoistway space, an elevator car arranged in the hoistway space to be vertically movable in the hoistway space between door openings at landings of a building, and doors at the door openings, wherein the elevator comprises a sensor providing to a control system a signal indicating a level difference between a first reference point fixed to one of the hoistway sections and a second reference point fixed to the building.

2. The elevator of claim 1, wherein the elevator comprises height adjusters via which the doors are suspended by the hoistway, the height adjusters providing adjustment to the doors in relation to the hoistway.

3. The elevator of claim 1, wherein the sensor is a force sensor having a first end attached to the first reference point and a second end attached to the second reference point, the force sensor configured to measure tension.

4. The elevator according to claim 1, wherein the first and second reference points are arranged in an upper part of the hoistway and the building.

5. The elevator according to claim 1, wherein the elevator is provided with several sensors, each sensor providing to the control system a signal indicating a level difference between a first reference point of the hoistway and a second reference point of the building, wherein the sensors and the corresponding first and second reference points are located at mutually different heights of the hoistway and the building.

6. The elevator according to claim 1, wherein the hoistway sections are modules arranged on top of each other to carry a weight of hoistway sections arranged at a higher level and to provide a part of the hoistway space.

7. The elevator according to claim 1, wherein lower located hoistway sections carry a weight of hoistway sections arranged at a higher level.

8. The elevator according to claim 1, wherein the hoistway sections are steel sections.

9. The elevator according to claim 1, wherein the control system processes signals obtained from one or more sensors and provides information indicating the level difference in mutual heights of the hoistway and the building.

10. The elevator according to claim 9, wherein the control system is connected to a communication system and provides the information indicating the level difference by transmitting the information to a service center monitoring the operation of the elevator.

11. The elevator according to claim 10, wherein the control system provides the information indicating the level on a display located at the installation site of the elevator.

12. A method of maintaining an elevator of a building, wherein the method comprises:

providing the elevator with a sensor providing an indication of a level difference between a first reference point fixed to a hoistway section forming an elevator hoistway in a hoistway space of the building, and a second reference point fixed to the building, determining a mutual change of height between the elevator hoistway and the building based on the indication provided by the sensor, and adjusting heights of devices in the elevator to compensate for the mutual change of height.

13. The method of maintaining an elevator according to claim 12, wherein said adjusting comprises adjusting height adjusters via which doors at landings of the building are suspended by the hoistway to compensate for the determined mutual change of height if the determined mutual change of height has reached a predetermined limit.

* * * * *